(12) United States Patent
Rozen et al.

(10) Patent No.: US 11,204,833 B1
(45) Date of Patent: Dec. 21, 2021

(54) NVM ENDURANCE GROUP CONTROLLER USING SHARED RESOURCE ARCHITECTURE

(71) Applicant: Western Digital Technologies, Inc., San Jose, CA (US)

(72) Inventors: Amir Rozen, Rishon Lezion (IL); Shay Benisty, Beer Sheva (IL); Vitali Linkovsky, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/906,961

(22) Filed: Jun. 19, 2020

(51) Int. Cl.
*G06F 11/10* (2006.01)
*G06F 11/30* (2006.01)
*G06F 11/07* (2006.01)

(52) U.S. Cl.
CPC ........ *G06F 11/1068* (2013.01); *G06F 11/076* (2013.01); *G06F 11/1044* (2013.01); *G06F 11/3037* (2013.01)

(58) Field of Classification Search
CPC .............. G06F 11/1068; G06F 11/076; G06F 11/1044; G06F 11/3037
See application file for complete search history.

(56) References Cited

U.S. PATENT DOCUMENTS

| 7,343,515 | B1* | 3/2008 | Gilbertson | G06F 11/0712 |
| | | | | 714/10 |
| 9,785,356 | B2 | 10/2017 | Huang | |
| 10,002,086 | B1 | 6/2018 | Achtenberg et al. | |
| 11,061,619 | B1* | 7/2021 | Benisty | G06F 1/3296 |
| 2005/0289290 | A1* | 12/2005 | Chen | G06F 8/654 |
| | | | | 711/103 |
| 2008/0192765 | A1* | 8/2008 | Oh | H04L 49/90 |
| | | | | 370/412 |
| 2008/0256228 | A1* | 10/2008 | Fellenstein | G06F 9/50 |
| | | | | 709/223 |
| 2009/0199198 | A1* | 8/2009 | Horii | G06F 9/505 |
| | | | | 718/104 |
| 2010/0088456 | A1* | 4/2010 | Chu | G06F 13/4022 |
| | | | | 710/316 |
| 2014/0325122 | A1* | 10/2014 | Kim | G06F 1/206 |
| | | | | 711/103 |

(Continued)

OTHER PUBLICATIONS

Yanqin Jin et al., KAML: A Flexible, High-Performance Key-Value SSD, 2017 IEEE International Symposium on High Performance Computer Architecture, pp. 373-384.

(Continued)

*Primary Examiner* — Guy J Lamarre
(74) *Attorney, Agent, or Firm* — Patterson & Sheridan, LLP; Steven H. Versteeg

(57) ABSTRACT

A method and apparatus for allocation of back-end (BE) logic resources between NVM sets. When a controller detects that an NVM set is in an idle state, it deallocates the BE logic from the originally assigned NVM set and provides the BE logic resource to another NVM set. An NVM set controller matrix maps interconnections between the BE logic resource and the new NVM set to enable use of the BE logic resource and the new NVM set. When a new command arrives for the originally assigned NVM set, the BE logic resources is re-allocated to the originally assigned NVM set.

19 Claims, 10 Drawing Sheets

(56) References Cited

U.S. PATENT DOCUMENTS

| | | | |
|---|---|---|---|
| 2017/0125090 A1* | 5/2017 | Zeng | G11C 16/28 |
| 2017/0265226 A1* | 9/2017 | Yano | H04W 48/18 |
| 2017/0371744 A1* | 12/2017 | Sehgal | G11C 16/10 |
| 2018/0373450 A1* | 12/2018 | Ji | G06F 9/4881 |
| 2019/0073302 A1 | 3/2019 | Allison et al. | |
| 2019/0317784 A1* | 10/2019 | Kong | G06F 9/45558 |
| 2020/0004445 A1* | 1/2020 | Benisty | G06F 3/061 |
| 2020/0004672 A1 | 1/2020 | Scott et al. | |
| 2020/0042181 A1* | 2/2020 | Lee | G06F 12/0246 |
| 2020/0151055 A1* | 5/2020 | Eom | G06F 3/0619 |
| 2021/0064471 A1* | 3/2021 | Park | G06F 9/44557 |

OTHER PUBLICATIONS

NVM Express™ Base Specification, Revision 1.4, Jun. 10, 2019, 403 pages.

* cited by examiner

NVM ENDURANCE GROUP CONTROLLER USING SHARED RESOURCE ARCHITECTURE

BACKGROUND OF THE DISCLOSURE

Field of the Disclosure

Embodiments of the present disclosure generally relate to data storage devices utilizing NVM set functionality, and more particularly, to NVM set shared resources architecture.

Description of the Related Art

Recent non-volatile memory (NVM) architectures have been developed to directly manage NAND memories coupled to them via NVM set functionality. An NVM set creates namespaces to group physical and/or logical NAND addresses of a data storage device (and potentially other physical data storage devices) to similarly performing portions of memory, that are in turn, managed by an NVM data storage device. In addition to abstracting away this functionality from other areas of the host and/or data storage device, NVM sets provide more predictability in terms of data storage speed, endurance, and reliability.

A host device communicates with the data storage device by issuing commands to an NVM set for data storage functionality. As such, each NVM set has its own dedicated set of back-end (BE) logic resources such as CPU's, ECC engines, flash interfaces, and data-path parts. With these logic resources, the host may perform data storage-related operations with a given NVM set.

Because BE logic resources are dedicated to a given NVM set in prior approaches, these resources are idle when the NVM set is idle, resulting in a waste of logic resources, that could be productively used with a non-idle NVM set to enhance performance. However, in prior approaches, there isn't a way to re-allocate BE logic resources between NVM sets.

Accordingly, what is needed are systems and methods to allocate BE logic resources between NVM sets, to productively use these resources when the originally dedicated NVM set of a BE logic goes into an idle state.

SUMMARY OF THE DISCLOSURE

The present disclosure relates to systems and methods for the allocation of back-end (BE) logic resources between NVM sets. When a controller detects that an NVM set is in an idle state, it deallocates the BE logic from the originally assigned NVM set and provides the BE logic resource to another NVM set. An NVM set controller matrix maps interconnections between the BE logic resource and the new NVM set to enable the use of the BE logic resource and the new NVM set. When a new command arrives for the originally assigned NVM set, the BE logic resources are re-allocated to the originally assigned NVM set.

In one embodiment, a data storage device is disclosed, that includes one or more memory devices, a controller coupled to the one or more memory devices comprising a MAC, an NVM set controller, a plurality of NVM sets, a plurality of back-end (BE) logics each BE logic correlating to a respective one of the plurality of NVM sets, wherein the controller is configured to carry out a method for sharing NVM set resources. In embodiments, the method includes detecting when a first NVM set of the plurality of NVM sets is in an idle state and allocating a first BE logic corresponding to the first NVM set to a second NVM set.

In another embodiment, a data storage device is disclosed, including one or more memory devices, and a controller coupled to the one or more memory devices comprising a MAC, an NVM set controller, a plurality of NVM sets, a plurality of back-end (BE) logics each BE logic correlating to a respective one of the plurality of NVM sets, wherein the controller is configured to carry out a method for sharing NVM set resources. In embodiments, the method includes allocating a first BE logic from a first NVM set to process commands for a second NVM set, detecting that a first command has arrived for the first BE logic, the first command pertaining to data on the first NVM set, and deallocating the first BE logic from the second NVM set to the first NVM set.

In another embodiment, a system for storing data is disclosed, the system including a memory means comprising a plurality of memory devices, and a controller means, the controller means. In embodiments the controller means includes a plurality of back-end (BE) logic means coupled to the memory means, an NVM set controller means defining one or more NVM sets, and an NVM set controller matrix means defining logical connection between each one of the plurality of BE logic means and each one of the one or more NVM sets.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure relates to systems and methods for the allocation of back-end (BE) logic resources between NVM sets. When a controller detects that an NVM set is in an idle state, it deallocates the BE logic from the originally assigned NVM set and provides the BE logic resource to another NVM set. An NVM set controller matrix maps interconnections between the BE logic resource and the new NVM set to enable the use of the BE logic resource and the new NVM set. When a new command arrives for the originally assigned NVM set, the BE logic resources are re-allocated to the originally assigned NVM set.

Figure 1:
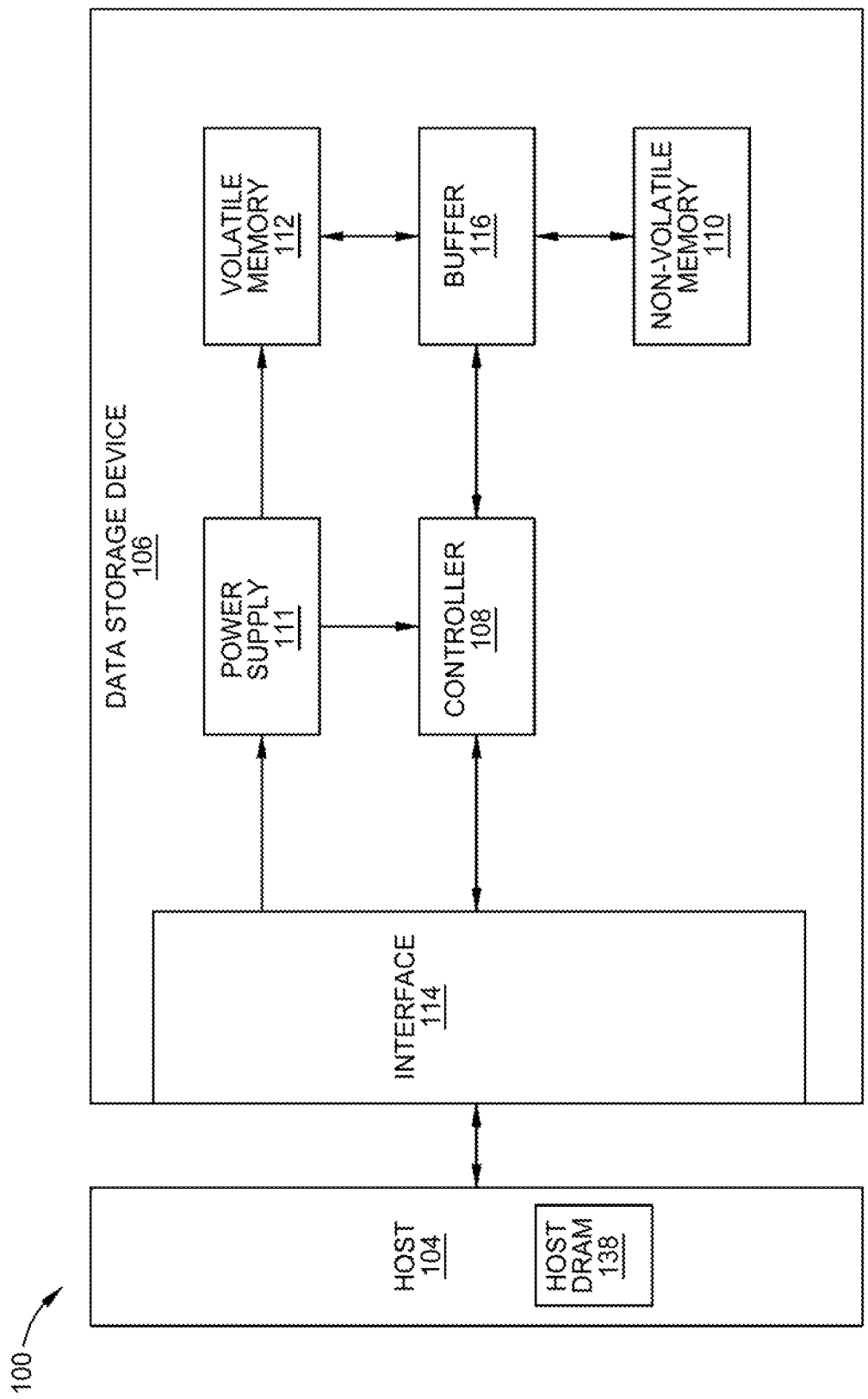
FIG. 1 is a schematic block diagram illustrating a storage system in which a data storage device may function as a storage device for a host device, according to disclosed embodiments.

FIG. 1 is a schematic block diagram illustrating a storage system 100 in which data storage device 106 may function as a storage device for a host device 104, according to disclosed embodiments. For instance, the host device 104 may utilize non-volatile memory devices 110 included in data storage device 106 to store and retrieve data. The host device 104 comprises a host DRAM 138. In some examples, the storage system 100 may include a plurality of storage devices, such as the data storage device 106, which may operate as a storage array, or be a component of a more extensive storage array. For instance, the storage system 100 may include a plurality of data storage devices 106 configured as a redundant array of inexpensive/independent disks (RAID) that collectively function as a mass storage device for the host device 104.

The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and a buffer 116. The controller 108 comprises an internal memory or buffer 116. In some examples, the data storage device 106 may include additional components not shown in FIG. 1 for the sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may in some embodiments be a USB-A connection, a USB-B connection, a mini USB-A connection, a mini USB-B connection, a micro USB-A connection, a micro USB-B connection, a USB-C connection, or a lightning connection. The connection unit may comprise of several pins with a specialized usage. Furthermore, connection units are utilized for various purposes, such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available, and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins, and each pin may have a different use. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may make up a single die, and in some embodiments may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices and may store data based on a charge contained in a floating gate of a transistor for each flash memory cell. In NAND flash memory devices, the flash memory device may be divided into a plurality of blocks, which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 includes a volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
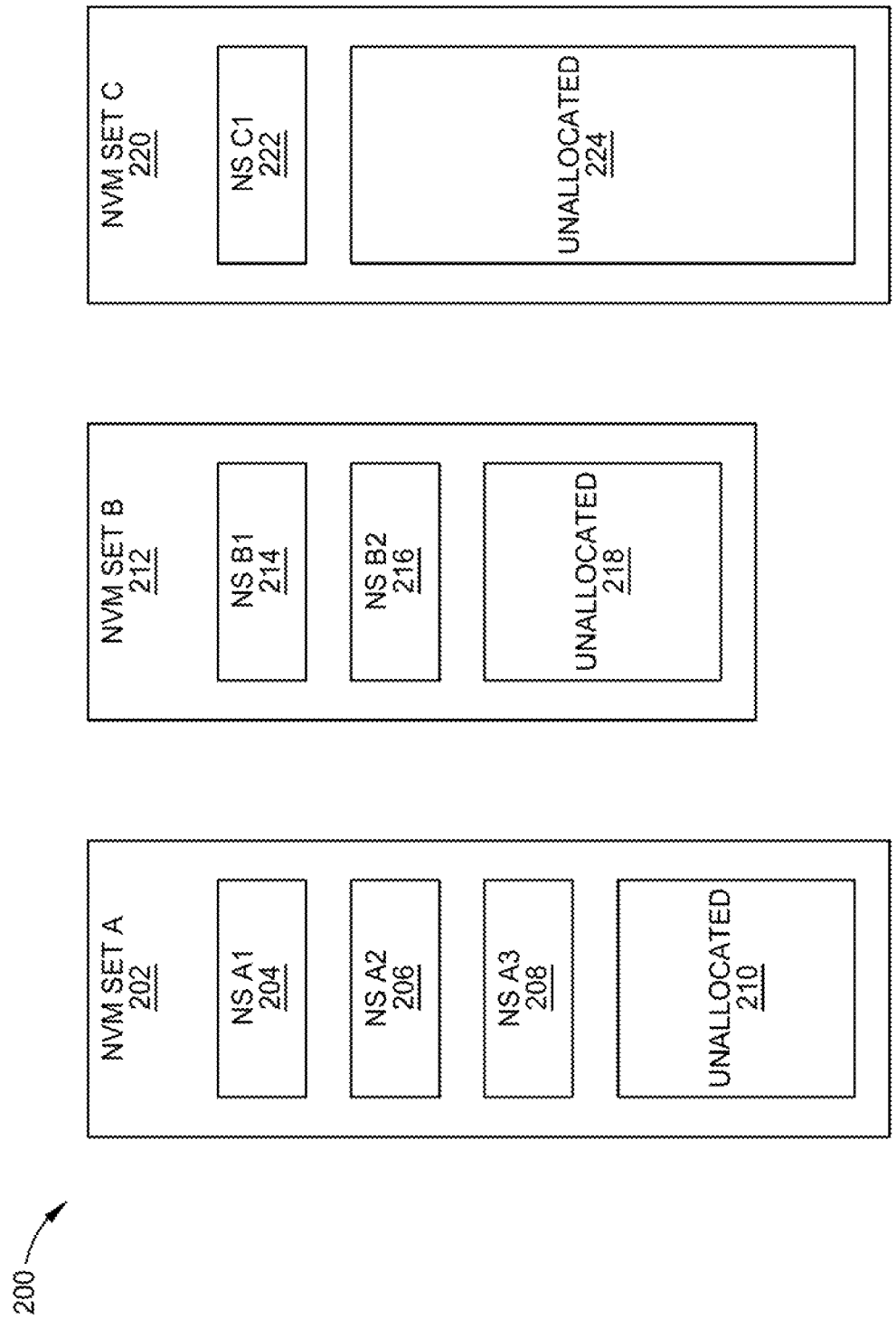
FIG. 2 depicts NVM sets and associated example namespaces, according to disclosed embodiments.

FIG. 2 depicts NVM sets and associated example namespaces, according to disclosed embodiments. The NVM of the one or more NVM sets 202, 212, 220 may be the NVM 110 of FIG. 1. Each NVM set includes one or more namespaces (NS) and an unallocated region that includes available NVM storage space not yet allocated to a namespace in the NVM set. In one embodiment, each NVM set includes the same number of namespaces. For example, a first NVM set A 202, a second NVM set B 212, and a third NVM set C 220 each includes one namespace. It is understood that the indicators "first," "second," and "third" in this context are relative and not absolute; that is, a "first" NVM set need not be the first on a die, or the first selected in a process. In another embodiment, each NVM set includes a different number of namespaces, where one or more NVM sets may have the same number of namespaces as one or more NVM sets. In another example, a first NVM set A 202 includes three namespaces, a first NS A1 204, a second NS A2 206, and a third NS A3 208. The second NVM set B 212 includes two namespaces, a first NS B1 214 and a second NS B2 216. The third NVM set C 220 includes one namespace, a first NS C1 222. Disclosed namespaces of an NVM may be the same size in some embodiments, while in other embodiments such namespaces may be of different sizes. Moreover, a namespace may be logically allocated across multiple NVM's or on a single NVM.

Each namespace includes one or more memory locations in the NVM, where each memory location in the NVM is unique to a namespace.

Furthermore, data stored in each namespace and each unallocated region of the NVM sets may be logically organized in a logical-to-physical (L2P) table. The L2P table includes pointers that point to the logical block address (LBA) of the relevant data stored in each memory location of the one or more NVM sets.

In one embodiment, each namespace of the one or more NVM sets may have the same amount of NVM storage space. For example, the first NS A1 204 and the second NS A2 206 of the first NVM set A 202 may each have the same storage space in the NVM, such as about 128 MB. In another embodiment, each namespace of the one or more NVM sets may have a different amount of NVM storage space, where one or more namespaces may have the same amount of NVM storage as one or more namespaces. In another example, the first NS A1 204 of the first NVM set A 202 may include about 128 MB of storage, and the second NS A2 206 of the first NVM set A 202 may include about 256 MB of storage. The listed values for storage capacity are not intended to be limiting, but to provide examples of possible embodiments.

In one embodiment, each unallocated region of the one or more NVM sets may have the same amount of NVM storage space. For example, an unallocated region 210 of the first NVM set A 202 and an unallocated region 218 of the second NVM set B 212 may each have the same storage space in the NVM, such as about 512 MB. In another embodiment, each unallocated region of the one or more NVM sets may have a different amount of NVM storage space, where one or more unallocated regions may have the same amount of NVM storage as one or more unallocated regions. In another example, the unallocated region 210 of the first NVM set A 202 may include about 1024 MB of storage and the unallocated region 218 of the second NVM set B 212 may include about 512 MB of storage. The listed values for storage capacity are not intended to be limiting, but to provide examples of possible embodiments.

Figure 3:
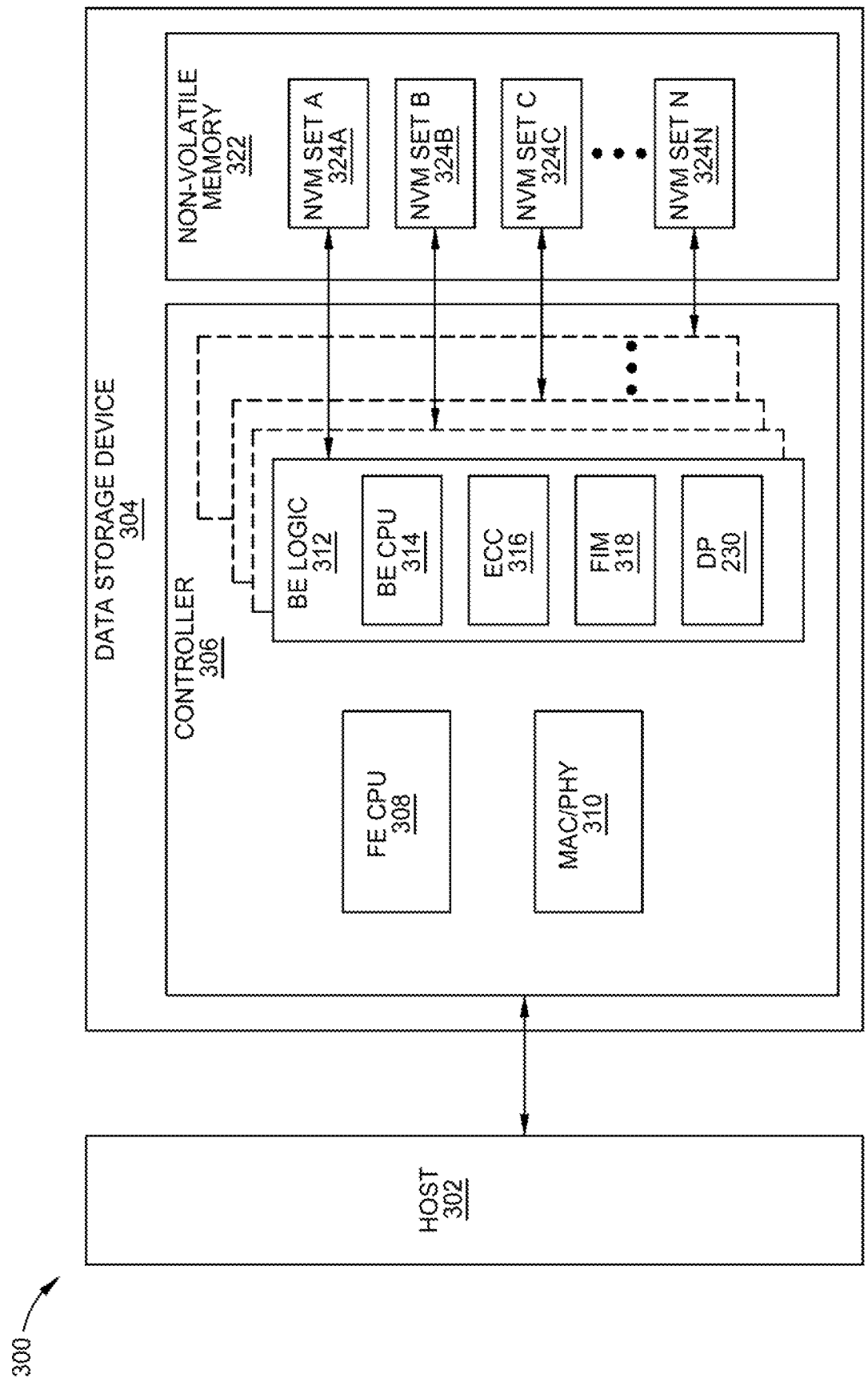
FIG. 3 depicts a controller with NVM set support, according to disclosed embodiments.

FIG. 3 depicts a controller with NVM set support, according to disclosed embodiments. Aspects of the storage system 100 of FIG. 1 and the NVM sets of FIG. 2 may be similar to the components described in FIG. 3. The host 302 may be the data storage device 304 of FIG. 1. The data storage device 304 includes a controller 306 and an NVM 322.

The controller 306 includes a front-end (FE) CPU 308, a MAC/PHY 310, and a plurality of back-end (BE) logic 312. Each of the plurality of BE logic 312 includes a BE CPU 314, an error correction code (ECC) engine 316, a flash interface module (FIM) 318, and a data-path (DP) part 320. Furthermore, each of the plurality of BE logic 312 corresponds to an NVM set of the plurality of NVM sets 324A-324N of the NVM 322. For example, if there are about eight NVM sets, then there are about eight BE logic 312 resources.

The BE CPU 314 may be responsible for processing and executing instructions to read from or write to the relevant NVM set of the plurality of NVM sets 324A-324N. The ECC engine 316 encodes and decodes ECC and error detection code (EDC) to the data written to the relevant NVM set. When reading from the NVM set, the ECC and EDC data are decoded, and the data is checked for errors. When an error is found, the ECC engine 316 may correct the data, such that the error is fixed. The FIM 318 may provide support to transfer data to the relevant location in the NVM set and from the relevant location in the NVM set. The DP part 320 may be responsible for performing data processing operations, registers, and buses.

The NVM 322 includes a plurality of NVM sets, such as a first NVM set A 324A, a second NVM set B 324B, a third NVM set C 324C, and an Nth NVM set N 324N. Each of the plurality of NVM sets 324A, 324B, 324C, 324N may be the NVM sets 202, 212, 220 of FIG. 2.

Data is transferred from the host 302 to the controller 306 of the data storage device 304. The MAC/PHY 310 may manage the ingress/egress of the data to the controller 306, such that the MAC/PHY utilizes the BE logic 312 to write to an NVM set of the plurality of NVM sets 324A, 324B, 324C, 324N of the NVM 322. After the controller 306 BE logic 312 as successfully processed the data sent by the host 302, the data is written to the relevant location in the NVM 322 (e.g., a first NVM set A 324A).

Figure 4:
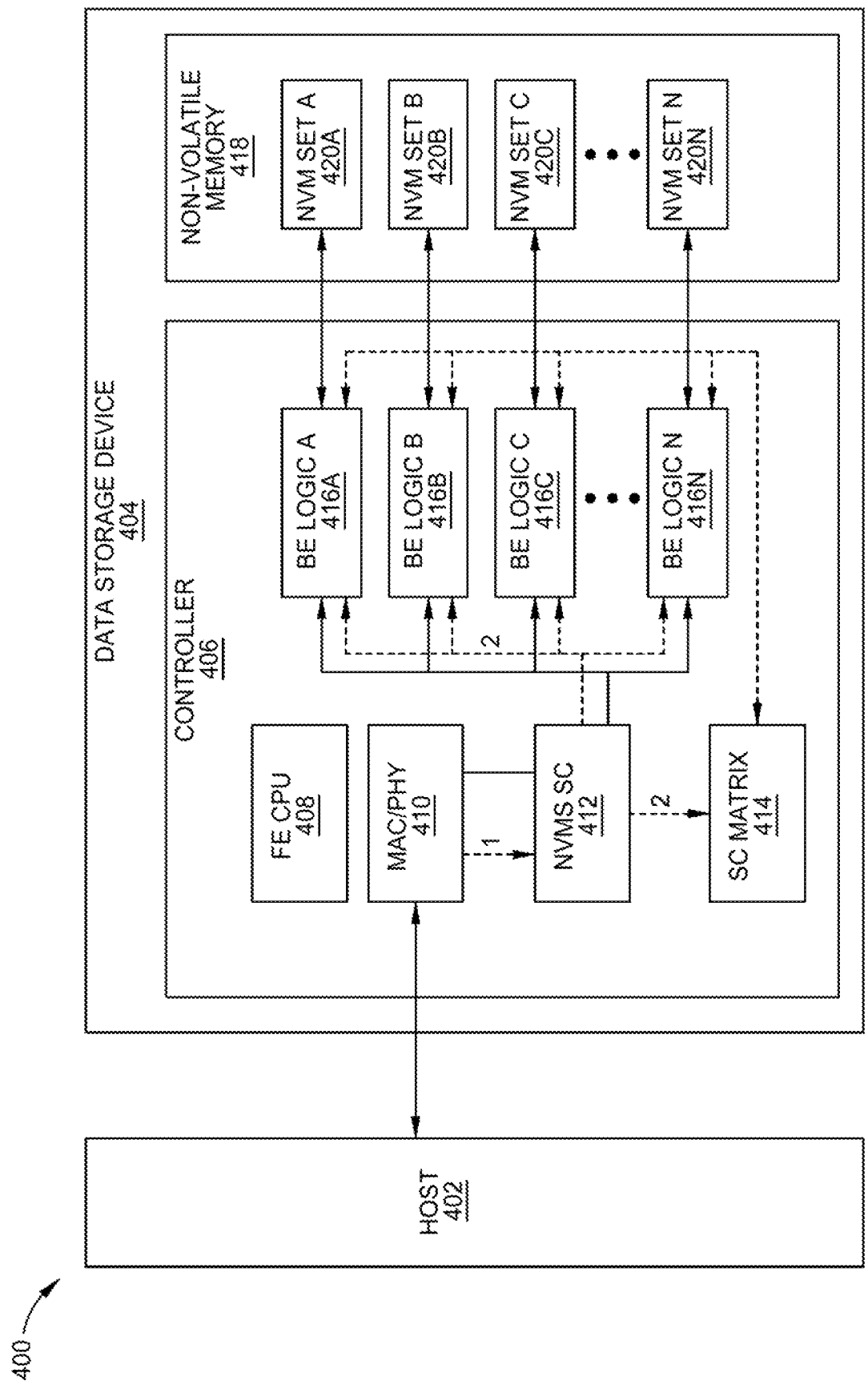
FIG. 4 depicts a controller with NVM set controller, according to disclosed embodiments.

FIG. 4 depicts a controller with NVM set controller, according to disclosed embodiments. Aspects of the data storage device 304 of FIG. 3 may be similar to the components of the data storage device 404 described herein. The controller further includes an NVM set (NVMS) sharing control (SC) 412 and an SC matrix 414. The NVMS SC 412 may appropriate any idle BE logic, such as a second BE logic B 416B, not currently utilized to an active NVM set, such that the BE logic resources are added to the active NVM set BE logic resources. Furthermore, the SC matrix 414 may configure each BE logic 416A-416N, such that the NVMS SC 412 may re-appropriate one or more BE logics 416A-416N from an idle NVM set to an active NVM set. The NVMS SC 412 manages the commands parsing and data transfer load between all allocated resources. In one embodiment, the SC Matrix 414 may be used to connect the FIM Y and the data buffers from allocated BE logics.

The indication for an idle NVM set may be the detection of not having any pending commands for an NVM set of the plurality of NVM sets for a predetermined amount of time. The predetermined amount of time before an NVM set may be considered idle may be about 1 μSec. For example, if a first NVM set A 420A is active and a second NVM set B 420B is idle, then the NVMS SC 412 may appropriate the second BE logic B 416B to aid in the operations of the first BE logic A 416A of the first NVM set A 420A.

When a doorbell request associated with an idle NVM set is received by the controller 306, the relevant command is fetched from the host command queue. The resources associated with the relevant idle NVM set may be utilized by another active NVM set. In order for the resources to be re-appropriated to the appropriate NVM set (e.g., a first BE logic A 416A with the first NVM set A 420A), the resources should be released by utilizing the NVMS SC 412. The NVMS SC 412 may have between about 1 μSec to about 2 μSec to release the relevant BE logic resource to be utilized for the incoming command from the host.

During data storage device 404 operation, the MAC/PHY 410 indicates to the NVMS SC 412 the status of outstanding commands for each NVM set 420A-420N along path 1. For example, any outstanding commands may be commands generated by the host 402 and fetched by the controller 406, but not yet executed by the controller 406. The outstanding commands may be any pending commands in the host queue waiting to be sent to or fetched by the controller 406. Likewise, pending commands in the controller queue may be commands waiting to be executed.

When a command is executed for a particular NVM set, such as a first NVM set A 420A, a control signal is sent from the NVMS SC 412 to both the SC Matrix 414 and the relevant BE logic 416A-416N of the NVM sets 420A-420N along path 2. The control signal may be either an allocate signal or a release signal.

When an allocate signal is sent from the NVMS SC 412 to both the C Matrix 414 and the relevant BE logic 416A-416N of the NVM sets 420A-420N along path 2, the relevant BE logic of the NVM sets 420A-420N is allocated for another NVM set Y. For example, the first BE logic A 416A for the first NVM set A 420A may be re-allocated to the second NVM set B 420B.

However, when a release signal is sent from the NVMS SC 412 to both the C Matrix 414 and the relevant BE logic 416A-416N of the NVM sets 420A-420N along path 2, the relevant BE logic of the NVM sets 420A-420N is released from another NVM set Y to be utilized for the corresponding NVM set. For example, the first BE logic A 416A for the second NVM set B 420B may be released back to the first NVM set A 420A.

Figure 5:
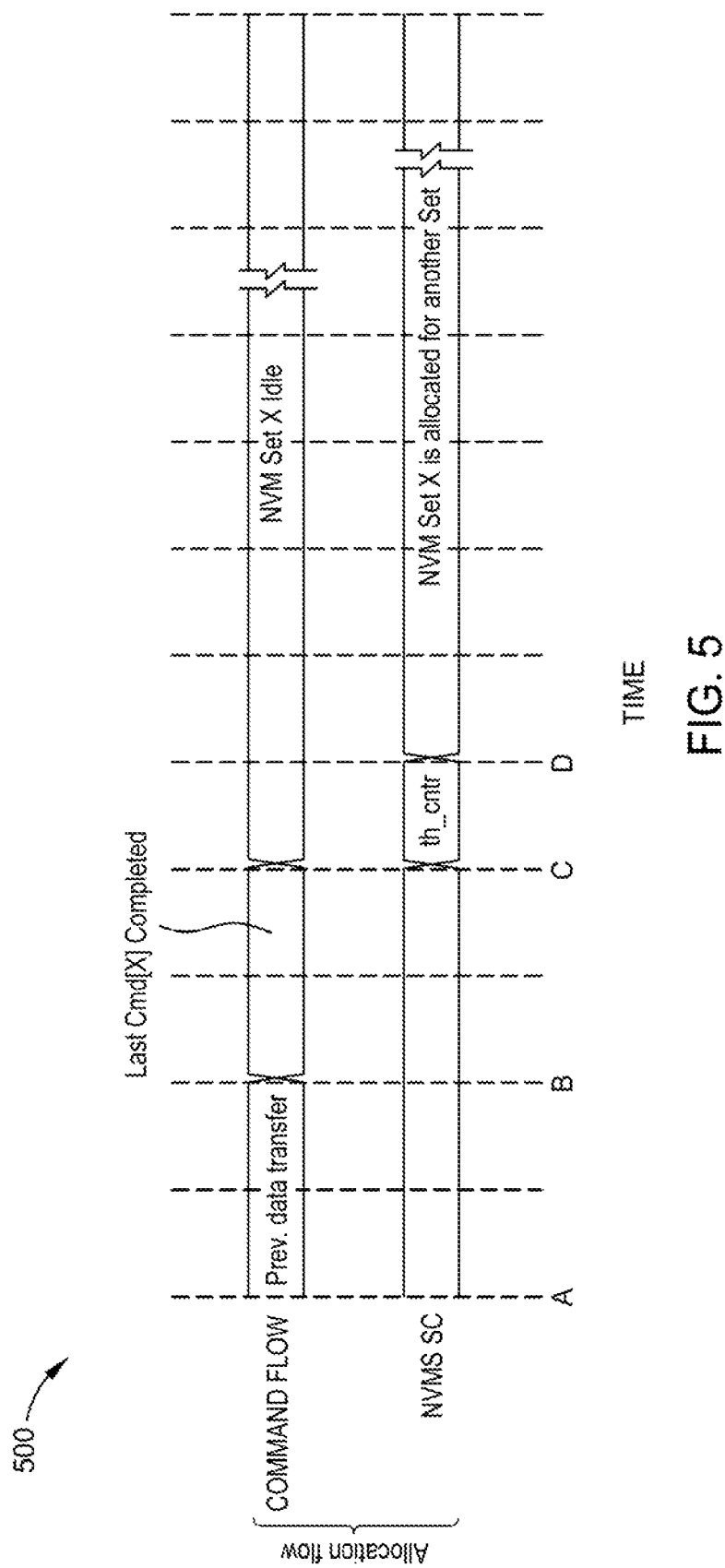
FIG. 5 depicts a timing diagram for the allocation of BE logic resources, according to disclosed embodiments.

FIG. 5 depicts a timing diagram for the allocation of BE logic resources, according to disclosed embodiments. The timing diagram illustrates the allocation flow of the command flow and the NVMS SC for the allocation of the BE logic of the NVM set X. At time A, the previous data transfer for the command flow is being executed. At time B, the previous data transfer has completed, and the controller may be indicating to the host that the command for the NVM set X has been successfully executed.

At time C, the command flow for the NVM set X is idled due to cleared command queue (e.g., no pending commands) for the NVM set X. Furthermore, at time C, the NVMS SC detects that there are no outstanding command related to NVM set X. The NVMS SC may start an idle state threshold counter (th_cntr) for the idled NVM set X at time C. When the controller detects that the th_cntr reaches a pre-configured threshold value, the BE logic of the NVM set X will be allocated to an active NVM set of the one or more NVM sets. The pre-configured threshold value may be about 1 μSec in some embodiments and up to about 10 μSec in other embodiments. In some embodiments the threshold value may be dynamically determined based on previous NVM behaviors. In these embodiments, for example, if there have been sufficient iterations in which getting BE logic of NVM set X was allocated to an active NVM set when NVM X entered a sleep mode, the threshold value could be 0 μSec. In one or more disclosed embodiments different NVM sets may have different threshold values. The listed pre-configured threshold value is not intended to be limiting, but to provide an example of a possible embodiment. The NVMS SC may send an indication to BE Logic of the NVM set X that the BE logic of NVM set X will be allocated to an active NVM set Y. At time D, the NVMS SC sends the indication to BE Logic of the active NVM Set Y of which BE logic of the one or more idled NVM sets are allocated to the active NVM set Y. In one embodiment, one or more BE logics may be allocated concurrently. By allocating one or more BE logics concurrently, the performance of the relevant active NVM set may be increased, thus increasing the overall performance of the drive.

Figure 6:
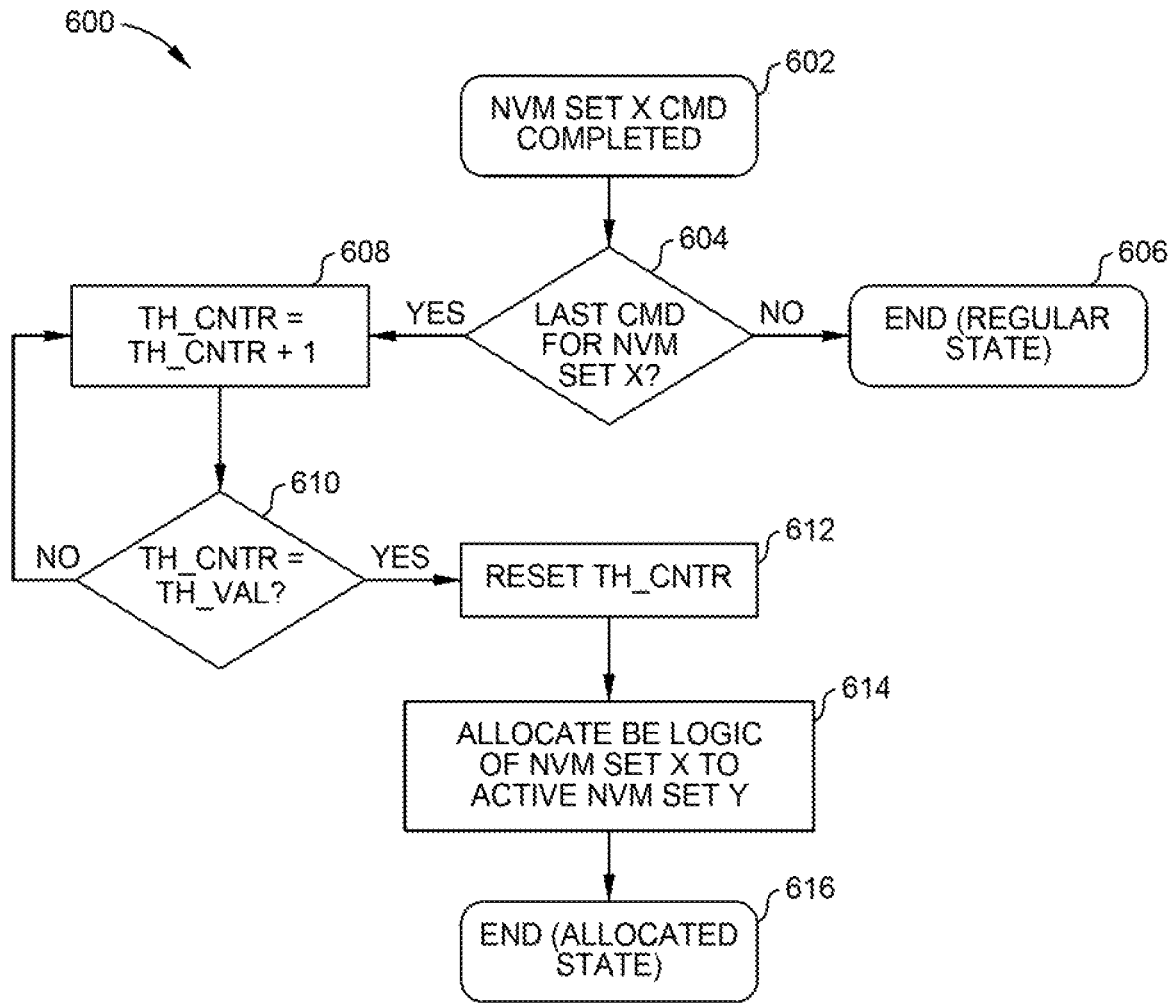
FIG. 6 depicts a BE logic allocation flow diagram, according to disclosed embodiments.

FIG. 6 depicts a BE logic allocation flow diagram, according to disclosed embodiments. At block 602, the NVM set X command has completed. At block 604, the controller determines if the completed command at block 602 is the last pending command in the command queue for the NVM set X. If the command queue for the NVM set X still contains pending commands, then the BE logic allocation flow ends at block 606 and returns to the regular state to complete the remaining pending commands.

However, if the NVM set X command queue does not include any pending commands at block 604, then at block 608, the idle state threshold counter (TH_CNTR) is incremented by the formula, TH_CNTR(new)=TH_CNTR(old)+1, where the TH_CNTR(new) is the updated threshold counter and the TH_CNTR(old) is the previous threshold counter. At block 610, the NVMS SC determines if the idle state threshold counter has reached the threshold value. The threshold value may be a pre-configured value of about 10 μSec. As discussed above, other threshold values, and dynamic threshold values, may be utilized in embodiments. The listed pre-configured threshold value is not intended to be limiting, but to provide an example of a possible embodiment. If the threshold value is not reached at block 610, then the NVMS SC waits until the idle state threshold counter has incremented at block 608 to the threshold value at block 610.

At block 612, the threshold value for the idle state threshold counter has been reached, and the idle state threshold counter is reset for future use for the relevant NVM set (e.g., NVM set X). At block 614, the NVMS SC utilizes the SC matrix to allocate the BE logic of the idled NVM set X to the active NVM set Y. After allocation of the BE logic of the idled NVM set X to the active NVM set Y, the BE logic allocation flow ends at block 616, where the relevant BE logic is in an allocated state.

Figure 7:
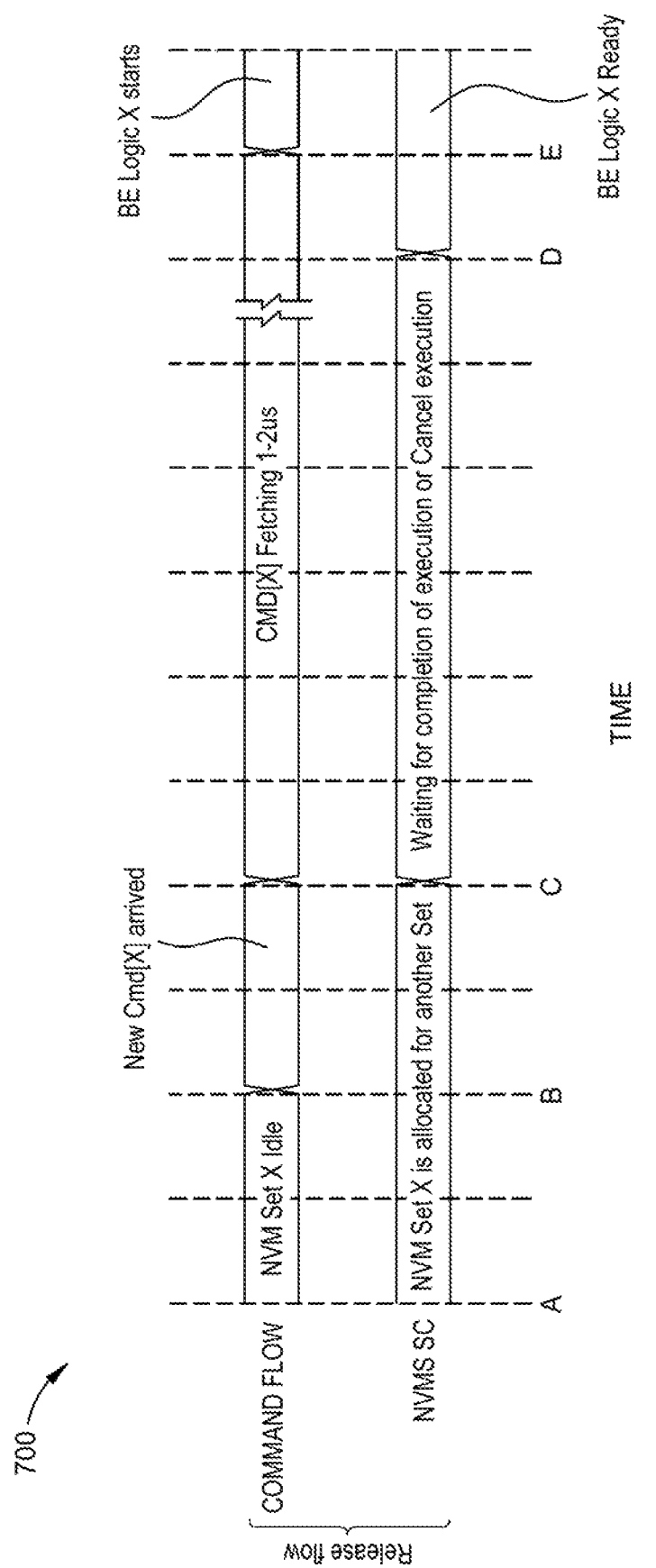
FIG. 7 depicts a BE logic de-allocation timing diagram, according to disclosed embodiments.

FIG. 7 depicts a BE logic de-allocation timing diagram, according to disclosed embodiments. The timing diagram illustrates the de-allocation (e.g., release) flow of the command flow and the NVMS SC for the de-allocation of the BE logic of the NVM set X from an NVM set Y. At time A, the BE logic of the NVM set X is allocated to an active NVM set, such as an NVM set Y, due to the idled NVM set X. At time B, a new command (e.g., a doorbell) for the NVM set X arrives at the MAC/PHY of the controller of the storage device. However, the NVMS SC detects that the BE logic for the NVM set X is allocated to an active NVM set Y. The NVMS SC stops providing new commands and/or data to NVM set X.

At time C, if a command has arrived after a fetching window of ~1-2us and the NVM set X is not ready (i.e., the BE logic for NVM set X has not been re-allocated from NVM set Y to NVM set X), then the current execution of the command and/or data is canceled. The NVMS SC will re-send the canceled command and/or data to another available set. In another embodiment, the NVMS SC may determine to complete the current command execution for the NVM set utilizing the relevant BE logic (e.g., the NVM set Y utilizing the BE logic for the NVM set X) if it may be completed within a reasonable amount of time, such as a threshold value of about 5 μSec to about 15 μSec, and in some embodiments is about 10 μSec. Until the command is completed, the received command for the NVM set X is postponed. At time D, the NVMS SC sends an indication to NVM set X that the BE logic for the NVM set X is not allocated to the NVM set Y. At time E, the BE logic for NVM set X begins to complete the received command for the NVM set X.

Figure 8:
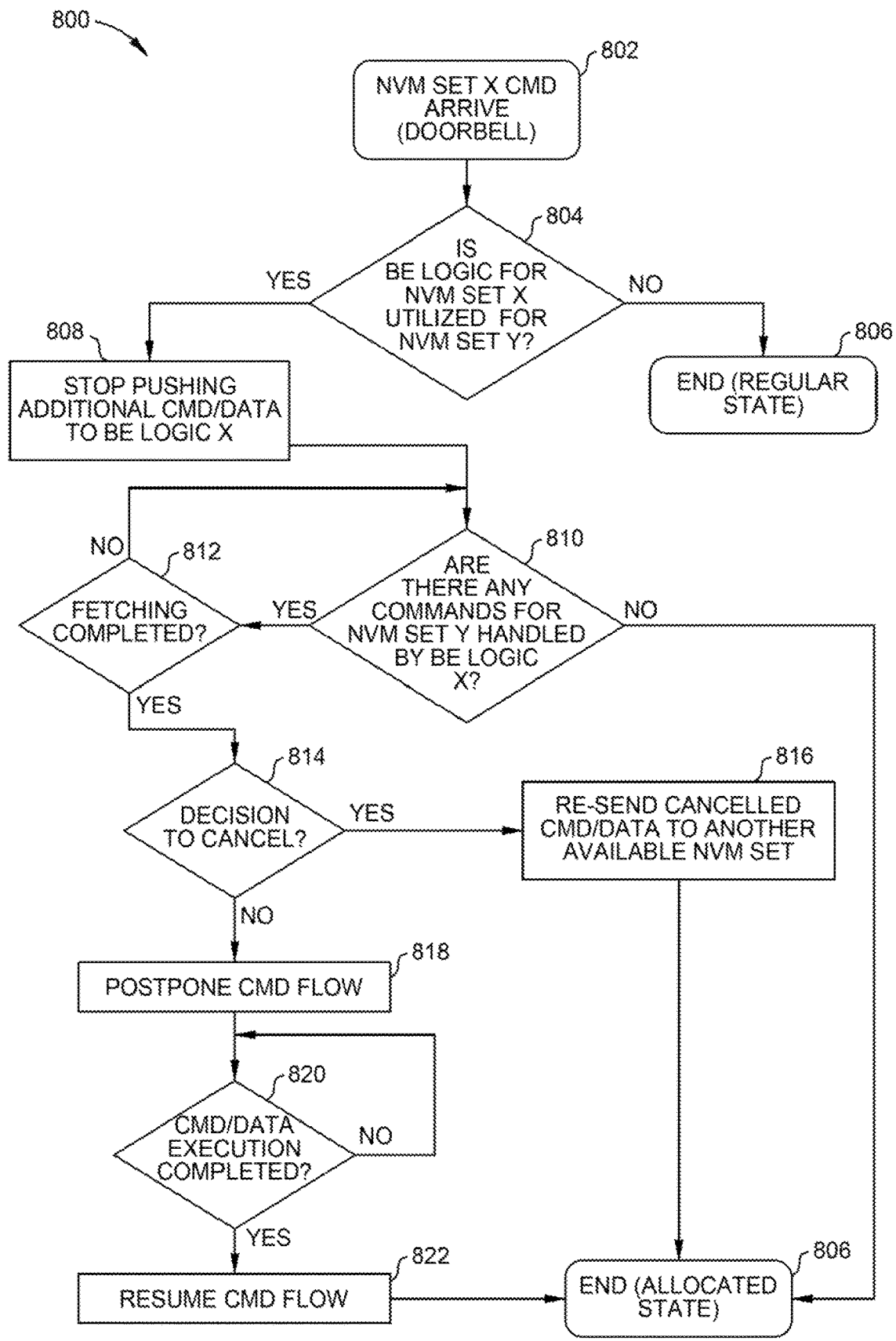
FIG. 8 depicts a BE logic de-allocation flow diagram, according to disclosed embodiments.

FIG. 8 depicts a BE logic de-allocation flow diagram, according to disclosed embodiments. At block 802, the controller of the storage device receives a doorbell for a command pertaining to NVM set X. At block 804, the controller NVMS SC determines if the received command is the first command for the NVM set X. If the BE logic of the NVM set X is occupied with a previous command for the NVM set X, then the de-allocation flow ends at block 806 and the BE logic of the NVM set X operates in a normal state.

However, if the NVMS SC, at block 804, determines that the BE logic of the NVM set X is occupied with a different NVM set, such as an NVM set Y, then the NVMS SC utilizes the SC matrix to stop the completion of any additional commands of the NVM set Y by the BE logic of the NVM set X at block 808. At block 810, the NVMS SC checks if there are any commands for the NVM set Y being handled by the BE logic of the NVM set X. If there are commands for the NVM set Y being handled by the BE logic of the NVM set X the NVMS SC waits for the fetching of the commands to NVM set X to be completed at block 812. If there are no commands for the NVM set Y to be handled by the BE logic of NVM set X, the BE logic of set X is deallocated from NVM set Y, and regular operations are resumed.

When the fetching of commands for the NVM set X are completed at block 812, the NVMS SC determines if the BE logic for the NVM set X has been re-allocated back to the NVM set X within the turnaround time of about 1 μSec to about 2 μSec. At block 814, the NVMS SC determines if the processing of the command to the NVM set X by the BE logic of NVM set X should be canceled. If the processing of the command to the NVM set X should be canceled at block 814, then the canceled command and/or data is sent to another available NVM set with an available BE logic at block 816. The de-allocation flow ends at block 806.

However, at block 814, if the NVMS SC determines that the processing of the command to the NVM set X should not be canceled, then at block 818, the command to the NVM set X is postponed until the BE logic of NVM set X is available. At block 820, the NVMS SC determines if the BE logic of NVM set X is no longer completing commands and/or data for the NVM set Y. If the BE logic of NVM set X is still being utilized by the NVM set Y at block 820, the NVMS SC waits for the commands and/or data to be completed. When the BE logic of NVM set X is released from the NVM set Y at block 820, the BE logic of NVM set X is utilized for the command and/or data of the NVM set X at block 822. The de-allocation flow ends at block 806.

Figure 9:
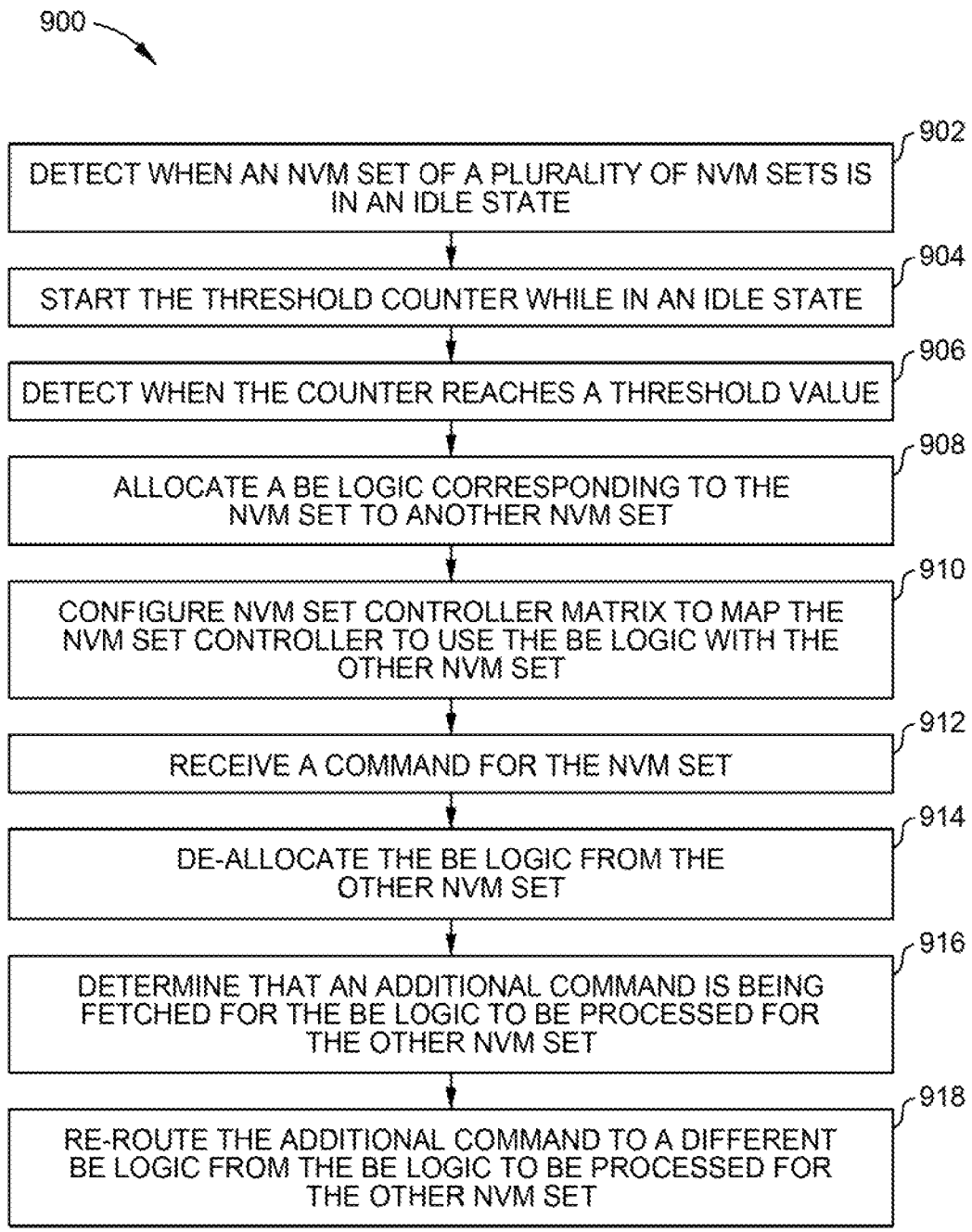
FIG. 9 depicts a method for allocating, and deallocating, BE logic resources, according to disclosed embodiments.

FIG. 9 depicts a method 900 for allocating BE logic resources, according to disclosed embodiments. When the NVMS SC detects that an NVM set, such as the NVM set A, of a plurality of NVM sets, is in an idle state at block 902, the NVMS SC starts an idle state threshold counter at block 904. The idle state threshold counter increments towards the threshold value. The threshold value in embodiments may be a pre-configured value of about 1 µSec to about 10 µSec, dynamically determined based upon previous behavior, and different NVM sets may have different threshold values. At block 906, the idle state threshold counter reaches the threshold value. At block 908, the BE logic for the NVM set is allocated to a another NVM set, such as the NVM set B, C, or N, where the other NVM set has an active command queue. Although in this example NVM set A is chosen as the set from with the BE logic is deallocated, and B, C, or N is chosen as the set to which the BE logic is allocated, it is understood that any NVM set may be chosen as the initial NVM set from which to deallocate the BE logic under the above-stated conditions, while any one of the remaining NVM sets may have the BE logic allocated to it, again under the above-stated conditions. At block 910, the SC matrix is configured to map the NVMS SC to use the BE logic with the other NVM set.

At block 912, the NVM set receives a doorbell for a command. The BE logic is deallocated from the other NVM set utilizing the BE logic de-allocation flow diagram of FIG. 8 at block 914. At block 916, the NVMS SC determines that an additional command is being fetched for the BE logic of the NVM set to process for the other NVM set. At block 918, the additional command is re-routed to another BE logic different from the original BE logic of the NVM set to be processed for the additional command of the other NVM set. Although in the depicted example the BE logic is deallocated from the NVM set to another NVM set, and back to the NVM set, it is understood that the BE logic may be deallocated from the other NVM set to yet another NVM set, without departing from the spirit and scope of this disclosure.

Figure 10:
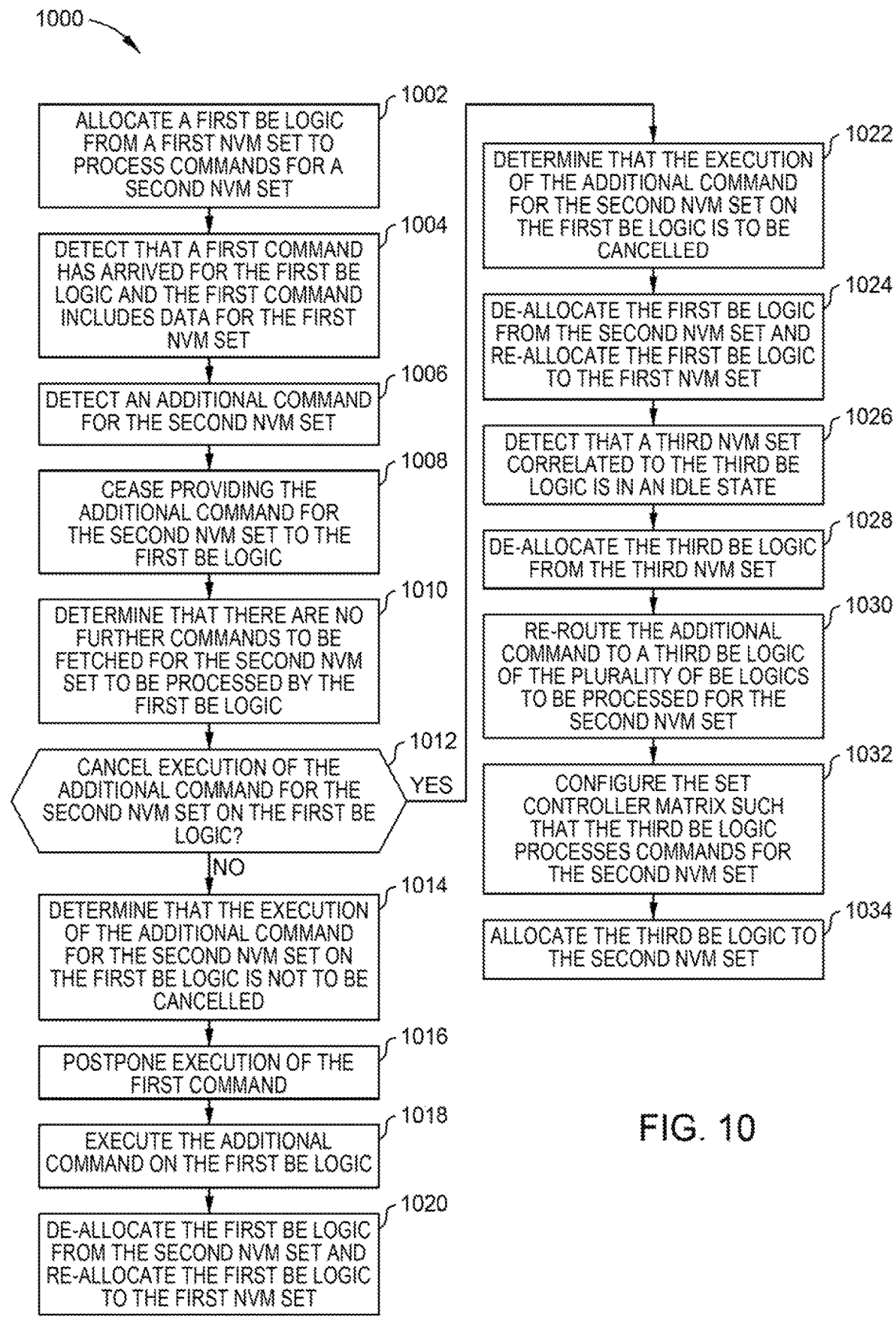
FIG. 10 depicts a method for allocating and deallocating BE logic resources, according to disclosed embodiments.

FIG. 10 depicts a method 1000 for deallocating BE logic resources, according to disclosed embodiments. At block 1002, the NVMS SC allocates a first BE logic from a first NVM set to process commands for a second NVM set. At block 1004, the NVMS SC detects that a first command has arrived for the first BE logic, where the first command includes data for the first NVM set.

At block 1006, the NVMS SC detects an additional command for the second NVM set. At block 1008, the NVMS SC ceases providing the additional command for the second NVM set to the first BE logic. At block 1010, the NVMS SC determines that there are no further commands to be fetched for the second NVM set to be processed by the first BE logic. At block 1012, the NVMS SC determines if the additional command for the second NVM set on the first BE logic should be canceled. If the execution of the additional command is not canceled at block 1014, the execution of the first command is postponed at block 1016, and the additional command on the first BE logic for the second NVM set is executed at block 1018. At block 1020, the NVMS SC deallocates the first BE logic from the second NVM set and re-allocates the first BE logic to the first NVM set. After re-allocating the first BE logic to the first NVM set at block 1020, the postponed first command may be completed by the first BE logic of the first NVM set.

However, if the execution of the additional command for the second NVM set on the first BE logic is canceled at block 1022, then the NVMS SC deallocates the first BE logic from the second NVM set and re-allocates the first BE logic to the first NVM set at block 1024. After re-allocating the first BE logic to the first NVM set at block 1024, the first command may be completed by the first BE logic of the first NVM set. At block 1026, the NVMS SC detects if a third NVM set correlated to a third BE logic is in an idle state outlined in the BE logic allocation flow diagram of FIG. 6. The third BE logic from the third NVM set is deallocated at block 1028, and the additional command is re-routed to the third BE logic to be processed for the second NVM set at block 1030. The SC matrix is configured such that the third BE logic processes commands for the second NVM set at block 1032. At block 1034, the third BE logic is allocated to the second NVM set.

By re-allocating the BE logic resources of one or more idle NVM sets to one or more active NVM sets, the resources of the storage device may be optimized, and the performance of the storage device may be increased.

In one embodiment, a data storage device is disclosed, that includes one or more memory devices, a controller coupled to the one or more memory devices comprising a MAC, an NVM set controller, a plurality of NVM sets, a plurality of back-end (BE) logics each BE logic correlating to a respective one of the plurality of NVM sets, wherein the controller is configured to carry out a method for sharing NVM set resources. In embodiments, the method includes detecting when a first NVM set of the plurality of NVM sets is in an idle state and allocating a first BE logic corresponding to the first NVM set to a second NVM set.

The data storage device further includes an NVM set controller matrix. The method further includes configuring the NVM set controller matrix to map the NVM set controller to use the first BE logic with the second NVM set. The first BE logic includes one of a CPU, an ECC engine, a flash interface, and a data-path part. The controller further includes a threshold counter. The method further includes starting the threshold counter when in an idle state and detecting when the counter reaches a threshold value. Detecting when the first NVM set is in an idle state includes detecting when a command to the first NVM set is complete and detecting that there are no additional commands following the command. The method further includes receiving a command for the first NVM set and deallocating the first BE logic from the second NVM set. The method further includes determining that an additional command is being fetched for the first BE logic to process for the second NVM set and re-routing the additional command to a different BE logic from the first BE logic, to process for the second NVM set.

In another embodiment, a data storage device is disclosed, including one or more memory devices, and a controller coupled to the one or more memory devices comprising a MAC, an NVM set controller, a plurality of NVM sets, a plurality of back-end (BE) logics each BE logic correlating to a respective one of the plurality of NVM sets, wherein the controller is configured to carry out a method for sharing NVM set resources. In embodiments, the method includes allocating a first BE logic from a first NVM set to process commands for a second NVM set, detecting that a first command has arrived for the first BE logic, the first command pertaining to data on the first NVM set, and deallocating the first BE logic from the second NVM set to the first NVM set.

The method further includes detecting an additional command for the second NVM set and ceasing providing the additional command for the second NVM set to the first BE logic. The method further includes determining, by the NVM set controller, that there are no further commands to be fetched for the second NVM set to be processed by the first BE logic and determining, by the NVM set controller, whether or not to cancel the execution of the additional command for the second NVM set on the first BE logic. The method further includes determining that the execution of the additional command for the second NVM set on the first BE logic is not to be canceled, postponing the execution of the first command, and executing the additional command on the first BE logic. The method further includes determining that the execution of the additional command for the second NVM set on the first BE logic is to be canceled and re-routing the additional command to a third BE logic of the plurality of BE logics to be processed for the second NVM set. The data storage device further includes an NVM set controller matrix. The method further includes configuring the set controller matrix such that the third BE logic processes commands for the second NVM set. The method further includes detecting that a third NVM set correlated to the third BE logic is in an idle state, deallocating the third BE logic from the third NVM set, and allocating the third BE logic to the second NVM set. The BE logic includes one of a CPU, an ECC engine, a flash interface, and a data-path part.

In another embodiment, a system for storing data is disclosed, the system including a memory means comprising a plurality of memory devices, and a controller means, the controller means. In embodiments the controller means includes a plurality of back-end (BE) logic means coupled to the memory means, an NVM set controller means defining one or more NVM sets, and an NVM set controller matrix means defining a logical connection between each one of the plurality of BE logic means and each one of the one or more NVM sets.

The controller is configured to carry out a method for sharing NVM set resources. The method includes detecting when a first NVM set of the one or more NVM sets is in an idle state and allocating a first BE logic corresponding to the first NVM set to a second NVM set. The controller is configured to carry out a method for sharing NVM set resources. The method includes allocating a first BE logic of the plurality of BE logics from a first NVM set of the one or more NVM sets to process commands for a second NVM set, detecting that a first command has arrived for the first BE logic, the first command pertaining to data on the first NVM set, and deallocating the first BE logic from the second NVM set to the first NVM set. The deallocating further includes determining, by the NVM set controller, that there are no further commands to be fetched for the second NVM set to be processed by the first BE logic and determining, by the NVM set controller, whether or not to cancel the execution of the additional command for the second NVM set on the first BE logic.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    one or more non-volatile memory (NVM) devices each comprising a plurality of NVM sets;
    a controller coupled to the one or more NVM devices, the controller comprising an NVM set controller (NVMS SC), and a plurality of back-end (BE) logics, each BE logic correlating to a respective one of the plurality of NVM sets, wherein the controller is configured to carry out a method for sharing NVM set resources, the method comprising:
        detecting when a first NVM set of the plurality of NVM sets is in an idle state; and
        allocating a first BE logic corresponding to the first NVM set to a second NVM set.

2. The data storage device of claim 1, further comprising an NVM set controller matrix.

3. The data storage device of claim 2, wherein the method further comprises configuring the NVM set controller matrix to map the NVM set controller to use the first BE logic with the second NVM set.

4. The data storage device of claim 3, wherein the first BE logic comprises one of a CPU, an error correction code (ECC) engine, a flash interface, and a data-path part.

5. The data storage device of claim 1, wherein the controller further comprises a threshold counter, and wherein the method further comprises starting the threshold counter when in an idle state, and detecting when the counter reaches a threshold value.

6. The data storage device of claim 5, wherein detecting when the first NVM set is in an idle state comprises detecting when a command to the first NVM set is complete, and detecting that there are no additional commands following the command.

7. The data storage device of claim 1, wherein the method further comprises:
    receiving a command for the first NVM set; and
    deallocating the first BE logic from the second NVM set.

8. The data storage device of claim 7, wherein the method further comprises
    determining that an additional command is being fetched for the first BE logic to process for the second NVM set; and
    re-routing the additional command to a different BE logic from the first BE logic to process for the second NVM set.

9. A data storage device comprising:
    one or more non-volatile memory (NVM) devices, each comprising a plurality of NVM sets; and
    a controller coupled to the one or more NVM devices comprising an NVM set controller, a plurality of back-end (BE) logics, each BE logic correlating to a respective one of the plurality of NVM sets, wherein the controller is configured to carry out a method for sharing NVM set resources, the method comprising:
        allocating a first BE logic from a first NVM set to process commands for a second NVM set; and detecting that a first command has arrived for the first BE logic, the first command pertaining to data on the first NVM set.

10. The data storage device of claim 9, wherein the method further comprises:
detecting an additional command for the second NVM set; and
ceasing providing the additional command for the second NVM set to the first BE logic.

11. The data storage device of claim 10, wherein the method further comprises:
determining, by the NVM set controller, that there are no further commands to be fetched for the second NVM set to be processed by the first BE logic; and
determining, by the NVM set controller, whether or not to cancel execution of the additional command for the second NVM set on the first BE logic.

12. The data storage device of claim 11, wherein the method further comprises:
determining that the execution of the additional command for the second NVM set on the first BE logic is not to be canceled;
postponing execution of the first command;
executing the additional command on the first BE logic; and
deallocating the first BE logic from the second NVM set to the first NVM set.

13. The data storage device of claim 11, wherein the method further comprises:
determining that the execution of the additional command for the second NVM set on the first BE logic is to be canceled;
deallocating the first BE logic from the second NVM set to the first NVM set; and
re-routing the additional command to a third BE logic of the plurality of BE logics to be processed for the second NVM set.

14. The data storage device of claim 13, further comprises an NVM set controller matrix, and wherein the method further comprises:
configuring the set controller matrix such that the third BE logic processes commands for the second NVM set.

15. The data storage device of claim 14, wherein the method further comprises:
detecting that a third NVM set correlated to the third BE logic is in an idle state;
deallocating the third BE logic from the third NVM set; and
allocating the third BE logic to the second NVM set.

16. The data storage device of claim 11, wherein the first BE logic comprises one of a CPU, an ECC engine, a flash interface, and a data-path part.

17. A system for storing data, the system comprising:
a non-volatile memory (NVM) means comprising a plurality of memory devices; and
a controller means, the controller means comprising:
a plurality of back-end (BE) logic means coupled to the NVM means;
an NVM set controller means defining one or more NVM sets;
an NVM set controller matrix means defining logical connection between each one of the plurality of BE logic means and each one of the one or more NVM sets; and
wherein the controller is configured to carry out a method for sharing NVM set resources, the method comprising:
detecting when a first NVM set of the one or more NVM sets is in an idle state; and
allocating a first BE logic means corresponding to the first NVM set to a second NVM set.

18. The system of claim 17, wherein the controller means is configured to carry out a method for sharing NVM set resources, the method comprising:
detecting that a first command has arrived for the first BE logic means, the first command pertaining to data on the first NVM set; and
deallocating the first BE logic means from the second NVM set to the first NVM set.

19. The system of claim 18, wherein the deallocating further comprises:
determining, by the NVM set controller, that there are no further commands to be fetched for the second NVM set to be processed by the first BE logic; and
determining, by the NVM set controller means, whether or not to cancel execution of an additional command for the second NVM set on the first BE logic.

* * * * *